US009989146B1

(12) United States Patent
Abington et al.

(10) Patent No.: US 9,989,146 B1
(45) Date of Patent: Jun. 5, 2018

(54) ADAPTIVE CLUTCH SLIP LEARNING FOR CRITICAL CAPACITY CLUTCH FUSING IN A CONTINUOUSLY VARIABLE TRANSMISSION (71) Applicant: GM GLOBAL TECHNOLOGY OPERATIONS LLC, Detroit, MI (US)

(72) Inventors: James L Abington, Brighton, MI (US); Chet Daavettila, Brighton, MI (US); Colin Hultengren, New Hudson, MI (US); Timothy R Stockdale, Brighton, MI (US); Dongxu Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days. days.

(21) Appl. No.: 15/479,540

(22) Filed: Apr. 5, 2017

(51) Int. Cl.
*F16H 61/00* (2006.01)
*F16D 48/06* (2006.01)
(Continued)

(52) U.S. Cl.
CPC ......... *F16H 61/0021* (2013.01); *F16D 48/06* (2013.01); *F16H 9/18* (2013.01); *F16H 37/022* (2013.01); *F16H 61/662* (2013.01); *F16D 2500/1026* (2013.01); *F16D 2500/10412* (2013.01); *F16D 2500/3024* (2013.01); *F16D 2500/3068* (2013.01); *F16D 2500/30401* (2013.01); *F16D 2500/30406* (2013.01); *F16D 2500/30415* (2013.01); *F16D 2500/30803* (2013.01); *F16D 2500/30806* (2013.01);
(Continued)

(58) Field of Classification Search
CPC ............... F16H 61/0021; F16H 61/662; F16H 2061/6608; F16D 48/06; F16D 2500/1026; F16D 2500/10412; F16D 2500/30406
See application file for complete search history.

(56) References Cited

U.S. PATENT DOCUMENTS 6,471,022 B1 10/2002 Goebel et al.
6,567,733 B2 5/2003 Popp et al.
(Continued)

FOREIGN PATENT DOCUMENTS

JP H102390 A 1/1998
JP 201108055 A 4/2001

OTHER PUBLICATIONS

US Application filed Oct. 10, 2016; U.S. Appl. No. 15/289,454; Applicant: GM Global Technology Operations LLC; Title: Clutch Control in a Continuously Variable Transmission.
(Continued)

*Primary Examiner* — Edwin A Young (57) ABSTRACT

A continuously variable transmission, a control system, and a method are provided. The control system and method are configured to learn a desired running pressure to be applied to a clutch that is lower than a pulley clamping pressure and higher than a pressure at which the clutch would slip (a clutch critical pressure), so that the clutch can act as a fuse to avoid pulley slip. A plurality of clutch slip tests are performed, each of which include decreasing pressure supplied to the clutch until a clutch slip occurs. Clutch slip data points are collected at the point of slip and used to determine a gain and an offset, where the gain is a clutch pressure versus clutch torque capacity gain, and the offset is a clutch pressure offset, which is used to determine the clutch critical pressure.

20 Claims, 5 Drawing Sheets (51) Int. Cl.
*F16H 61/662* (2006.01)
*F16H 37/02* (2006.01)
*F16H 9/18* (2006.01)
*F16H 45/02* (2006.01)
*F16H 61/66* (2006.01)

(52) U.S. Cl.
CPC .............. *F16D 2500/30816* (2013.01); *F16D 2500/3109* (2013.01); *F16D 2500/3144* (2013.01); *F16D 2500/70217* (2013.01); *F16D 2500/70276* (2013.01); *F16D 2500/70426* (2013.01); *F16H 45/02* (2013.01); *F16H 2037/026* (2013.01); *F16H 2061/6608* (2013.01); *F16H 2200/2005* (2013.01); *F16H 2200/2035* (2013.01)

(56) References Cited

U.S. PATENT DOCUMENTS

| | | | |
|---|---|---|---|
| 6,730,001 | B1 | 5/2004 | Vohmann et al. |
| 6,769,526 | B2 | 8/2004 | Iida et al. |
| 6,801,845 | B2 | 10/2004 | Henneken et al. |
| 6,974,009 | B2 | 12/2005 | Hoshiya et al. |
| 7,130,732 | B2 | 10/2006 | Spoerl et al. |
| 7,140,990 | B2 | 11/2006 | Sawada et al. |
| 7,188,717 | B2 | 3/2007 | Hoshiya et al. |
| 7,225,071 | B2 | 5/2007 | Akaike |
| 7,366,601 | B2 | 4/2008 | Ayabe et al. |
| 7,509,203 | B2 | 3/2009 | Imamura et al. |
| 7,678,016 | B2 | 3/2010 | Nakayama |
| 7,769,517 | B2 | 8/2010 | Segawa et al. |
| 7,769,518 | B2 | 8/2010 | Segawa et al. |
| 8,150,585 | B2 | 4/2012 | Hinami et al. |
| 8,165,766 | B2 | 4/2012 | Mueller et al. |
| 8,296,023 | B2 | 10/2012 | Kojima et al. |
| 8,296,038 | B2 | 10/2012 | Verdejo et al. |
| 8,392,082 | B2 | 3/2013 | Yamada |
| 8,406,969 | B2 | 3/2013 | Shimozato |
| 8,457,847 | B2 | 6/2013 | Li et al. |
| 8,491,443 | B2 | 7/2013 | Hofler et al. |
| 8,494,729 | B2 | 7/2013 | Li et al. |
| 8,532,890 | B2 | 9/2013 | Wellenkotter et al. |
| 8,585,544 | B2 | 11/2013 | Honda |
| 8,620,543 | B2 | 12/2013 | Li et al. |
| 8,768,590 | B2 | 7/2014 | Tsukamoto et al. |
| 8,775,036 | B2 | 7/2014 | Inoue |
| 8,814,741 | B2 | 8/2014 | Kikura et al. |
| 8,825,321 | B2 | 9/2014 | Dohi et al. |
| 8,954,247 | B2 | 2/2015 | Kushiyama et al. |
| 9,080,619 | B2 | 7/2015 | Li et al. |
| 9,151,685 | B2 | 10/2015 | Li et al. |
| 9,482,328 | B2 | 11/2016 | Kao et al. |
| 9,482,329 | B2 | 11/2016 | Kao et al. |
| 2003/0069682 | A1 | 4/2003 | Iwatsuki et al. |
| 2009/0065318 | A1* | 3/2009 | Soga ................... F16H 61/0021 192/3.29 |
| 2013/0253785 | A1* | 9/2013 | Murasawa ............. B60W 10/11 701/53 |
| 2016/0123448 | A1 | 5/2016 | Samie et al. |

OTHER PUBLICATIONS

US Application filed Oct. 13, 2016, U.S. Appl. No. 15/303,781, Applicant: GM Global Technology Operations LLC; Title: Transmission for a Powertrain.

US Application filed Aug. 7, 2015 U.S. Appl. No. 14/820,746, Applicant: GM Global Technology Operations LLC; Title: Continuously Variable Transmission.

US Application fied Nov. 8, 2016, U.S. Appl. No. 15/346,349, Applicant: GM Global Technology Operations LLC; Title: Control of a Continuously Variable Transmission Using Fast Fourier Transformation.

US Application filed Sep. 6, 2016, U.S. Appl. No. 15/256,808, Applicant: GM Global Technology Operations LLC; Title: Continuously Variable Transmission and System and Method of Control for High Torque Events.

International Patent Application Filing date Apr. 11, 2016, Application No. PCT/CN2016/078953, Applicant: GM Global Technology Operations LLC; Title: CVT with fixed ration using layshaft gearsets and dog clutches.

International Patent Application Filing date Apr. 11, 2016, Application No. PCT/CN2016/078952, Applicant: GM Glocabl Technology Operations LLC; Title: Power-Split 2-Mode CVT.

* cited by examiner

ADAPTIVE CLUTCH SLIP LEARNING FOR CRITICAL CAPACITY CLUTCH FUSING IN A CONTINUOUSLY VARIABLE TRANSMISSION

TECHNICAL FIELD

The present disclosure pertains to a continuously variable transmission (CVT), a control system, and a method for controlling a clutch of the CVT.

INTRODUCTION

A continuously variable transmission (CVT) is a type of power transmission that is capable of continuously changing an output/input speed ratio over a range between a minimum (underdrive) ratio and a maximum (overdrive) ratio, thus permitting an infinitely variable selection of engine operation that can achieve a preferred balance of fuel consumption and engine performance in response to an output torque request. Unlike conventionally-geared transmissions that use one or more planetary gear sets and multiple rotating and braking friction clutches to establish a discrete gear state, a CVT uses a variable-diameter pulley system to achieve the infinitely variable selection of gear ratios.

The pulley system, which is commonly referred to as a variator assembly, can transition anywhere within the calibrated range of speed ratios. A typical belt-type or chain-type variator assembly includes two variator pulleys interconnected via an endless rotatable drive element, such as a drive chain or belt. The endless rotatable drive element rides within a variable-width gap defined by conical pulley faces. One of the variator pulleys receives engine torque via a crankshaft, torque converter, and an input gear set, and thus acts as a driving/primary/first pulley. The other pulley is connected via additional gear sets to an output shaft of the CVT and thus acts as a driven/secondary pulley. One or more planetary gear sets may be used on the input or output sides of the variator assembly. For example, a planetary gear set may be used on the input side with forward and reverse clutches to change direction, depending on the configuration.

In order to vary a CVT speed ratio and to transfer torque to the drivetrain, a clamping force (applied through hydraulic pressure) may be applied to one or both of the variator pulleys via one or more pulley actuators. The clamping force effectively squeezes the pulley halves together to change the width of the gap between pulley faces. Variation of the gap size, i.e., the pitch radius, causes the rotatable drive element to ride higher or lower within the gap. This, in turn, changes the effective diameters of the variator pulleys and may vary the speed ratio of the CVT. A clamping force may also applied to transfer a desired amount of torque from one pulley to another through the continuous member, where the amount of clamping force applied is intended to prevent the continuous member from slipping on the pulleys.

A spike or disturbance in output torque may cause the endless rotatable member to slip within the pulleys, potentially damaging the pulleys and resulting in poor performance. Accordingly, a CVT control system may apply a maximum clamping pressure to the CVT pulleys when detecting a torque spike, to prevent the continuous member from slipping. Such maximum clamping pressure, however, has a negative effect on fuel economy.

SUMMARY

The present disclosure provides a method, control system, and CVT that adjusts pressure to an applied clutch to allow the clutch to slip first during a transient event to prevent the pulley system from slipping. The control system and method are configured to learn a desired applied running pressure to be applied to a clutch that is lower than a pulley clamping pressure and higher than a pressure at which the clutch would slip (a clutch critical pressure), so that the clutch can act as a fuse to avoid pulley slip. Clutch slip tests are performed, which include decreasing pressure supplied to the clutch until a clutch slip occurs. Clutch slip data points in two or more ranges are collected at the point of detection of slip and used to determine a gain and an offset, which is used to determine the clutch critical pressure. The gain is a clutch pressure versus clutch torque capacity gain, and the offset is a clutch pressure offset.

In one form, which may be combined with or separate from the other forms disclosed herein, a method for controlling a clutch of a continuously variable transmission (CVT) including a variator assembly for a motor vehicle is provided. The method includes a step of performing a plurality of clutch slip tests. Each clutch slip test includes decreasing pressure supplied to the clutch until a clutch slip occurs at a clutch slip data point including a clutch slip pressure value and a corresponding clutch slip torque value, storing in a memory the clutch slip data point including the clutch slip pressure value and the corresponding clutch slip torque value, and increasing pressure supplied to the clutch after storing in the memory the clutch slip data point. The clutch slip is determined by a plurality of sensors. The step of performing the plurality of clutch slip tests results in a plurality of clutch slip data points being stored in the memory including at least a first clutch slip data point having a clutch slip torque value in a first range and at least a second clutch slip data point having a clutch slip torque value in a second range. Additional ranges may also be used/required, such as third and fourth ranges. The method further includes step of determining a gain and an offset based on the plurality of clutch slip data points, where the gain is a clutch pressure versus clutch torque capacity gain, and the offset is a clutch pressure offset. The method includes a step of supplying a running clutch pressure to the clutch that is lower than a pulley clamping pressure of the variator assembly and higher than a clutch critical pressure determined based on the slip gain and the slip offset.

In another form, which may be combined with or separate from the other forms disclosed herein, a control system for controlling a clutch of a CVT is provided. The control system has a memory and an instruction set. The instruction set is executable to perform a plurality of clutch slip tests. For each clutch slip test, the control system is configured to: decrease pressure supplied to the clutch until a clutch slip occurs at a clutch slip data point including a clutch slip pressure value and a corresponding clutch slip torque value, the clutch slip being determined by a plurality of sensors; store in the memory the clutch slip data point including the clutch slip pressure value and the corresponding clutch slip torque value; and increase pressure supplied to the clutch after storing in the memory the clutch slip data point. The control system is configured to perform a plurality of clutch slip tests and to store in the memory a plurality of clutch slip data points including at least a first clutch slip data point having a clutch slip torque value in a first range and at least a second clutch slip data point having a clutch slip torque value in a second range. Additional ranges may also be used/required, such as third and fourth ranges. The instruction set is further executable to determine a gain and an offset based on the plurality of clutch slip data points, where the gain is a clutch pressure versus clutch torque capacity gain, and the offset is a clutch pressure offset, and cause a hydraulic system to supply a running clutch pressure to the clutch that is lower than a pulley clamping pressure of the variator assembly and higher than a clutch critical pressure determined based on the gain and the offset.

In yet another form, which may be combined with or separate from the other forms disclosed herein, a continuously variable transmission (CVT) for a motor vehicle is provided. The CVT includes a variator assembly having a first pulley and a second pulley, the first and second pulleys rotatably coupled by a continuous rotatable device. The second pulley is rotatably coupled to an output member. The first pulley includes a first moveable sheave that is translatable along a first axis relative to a first stationary sheave in response to urging of a first actuator, and the second pulley includes a second moveable sheave that is translatable along a second axis relative to a second stationary sheave in response to urging of a second actuator. A clutch is provided that is selectively engageable to couple the first pulley to an input member. A hydraulic system is configured to supply pressure to the variator assembly and the clutch. In addition, the CVT includes a control system having at least one controller, a memory, and a plurality of sensors in communication with the controller. The control system is configured to perform a plurality of clutch slip tests. For each clutch slip test, the control system is configured to: decrease pressure supplied to the clutch by the hydraulic system until a clutch slip occurs at a clutch slip data point including a clutch slip pressure value and a corresponding clutch slip torque value, the clutch slip being determined by at least a portion of the plurality of sensors; store in the memory the clutch slip data point including the clutch slip pressure value and the corresponding clutch slip torque value; and increase pressure supplied to the clutch by the hydraulic system after storing in the memory the clutch slip data point. The control system is configured to perform a plurality of clutch slip tests and to store in the memory a plurality of clutch slip data points including at least a first clutch slip data point having a clutch slip torque value in a first range and at least a second clutch slip data point having a clutch slip torque value in a second range. Additional ranges may also be used/required, such as third and fourth ranges. The control system is further configured to determine a gain and an offset based on the plurality of clutch slip data points, where the gain is a clutch pressure versus clutch torque capacity gain, and the offset is a clutch pressure offset, and cause the hydraulic system to supply a running clutch pressure to the clutch that is lower than a pulley clamping pressure of the variator assembly and higher than a clutch critical pressure determined based on the gain and the offset.

Additional features may be provided, including but not limited to the following: the method and control system being configured to interpolate a best-fit line through the plurality of clutch slip data points; the first range being a medium-low range; the second range being a medium-high range; further including at least a third clutch slip data point having a clutch slip torque value in a bottom-low range and at least a fourth clutch slip data point having a clutch slip torque value in a top-high range; the control system and method being configured to perform the plurality of clutch slip tests for a duration of vehicle driving conditions within a normal driving range; each of the bottom-low range, the medium-low range, the medium-high range, and the top-high range being greater than a null-low torque range and less than a null-high torque range; wherein each of the bottom-low range, the medium-low range, the medium-high range, and the top-high range do not overlap with each other; the method and control system being configured to perform each clutch slip test with a predetermined delay period between performing each clutch slip test.

In addition, the method and control system may be configured to determine whether a plurality of predetermined conditions are met prior to performing the step of performing the plurality of clutch slip tests. The predetermined conditions may include one or more of the following: the vehicle operating in steady-state conditions; the turbine acceleration being within a predetermined turbine acceleration range; the engine acceleration being within a predetermined engine acceleration range; vehicle acceleration being within a predetermined vehicle acceleration range; a throttle position exceeding a predetermined threshold; a torque converter clutch being engaged; clutch slip not already detected; transmission fluid temperature being within a predetermined temperature range; propulsion system diagnostics and the plurality of sensors being free of a default mode; CVT ratio change being within a predetermined CVT ratio change range; clutch pressure scheduling arbitration allowing a clutch slip test to be undertaken; and stability timer conditions being met.

Additional features may include the following: during a clutch slip test, the method and control system being configured to first rapidly decrease the pressure to a deboost pressure in a deboost time period, and second, decrease the pressure from the deboost pressure until the clutch slip occurs in a slip time period, where the slip time period is longer than the deboost time period. The pressure may be first rapidly decreased to the deboost pressure to get the clutch pressure as close to the clutch critical pressure as possible without actually slipping to shorten the amount of time the test takes.

Further additional features may include the following: the plurality of sensors including a first speed sensor fixed to a torque converter turbine and a second speed sensor fixed to a primary pulley of the variator assembly; the clutch slip being determined by detecting a differential between the first and second speed sensors; the method and control system being further configured to apply the running clutch pressure to the clutch prior to performing each clutch slip test; the running clutch pressure being equal to a clutch critical pressure plus a safety factor; the method and control system being configured to increase pressure supplied to the clutch after storing in the memory the clutch slip data point prior to actual slip of the clutch; the method and control system being configured to update the best-fit line each time a clutch slip data point is stored; the method and control system being further configured to perform a rate limiting function so that a change to the best-fit line is limited to a predetermined maximum change for each clutch slip data point stored; the deboost pressure being a first deboost pressure, the method and control system being further configured to determine whether a clutch slip has occurred during the deboost time period, and if a clutch slip has occurred during the deboost time period a predetermined number of times (such as five or six times), erase the clutch slip data points stored in the memory and reset the first deboost pressure to a second deboost pressure that is higher than the first deboost pressure, by increasing the stored clutch pressure offset by a calibratable scale of the first deboost pressure to arrive at the second deboost pressure; and the clutch being a forward drive CVT clutch.

Further aspects, advantages and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar to directional terms are not to be construed to limit the scope of the disclosure in any manner.

Figure 1:
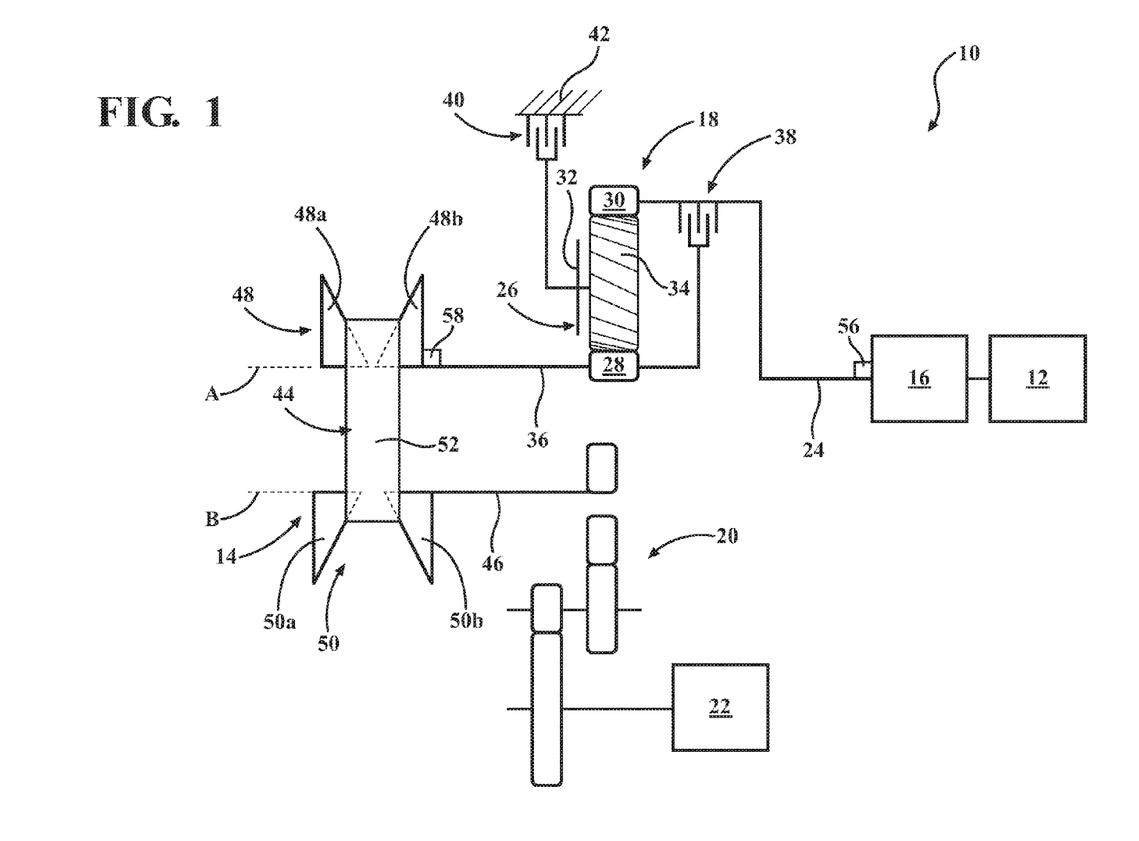
FIG. 1 is a schematic diagrammatic illustration of a motor vehicle propulsion system that includes an internal combustion engine rotatably coupled to a continuously variable transmission (CVT) assembly, in accordance with the principles of the present disclosure.
Figure 2:
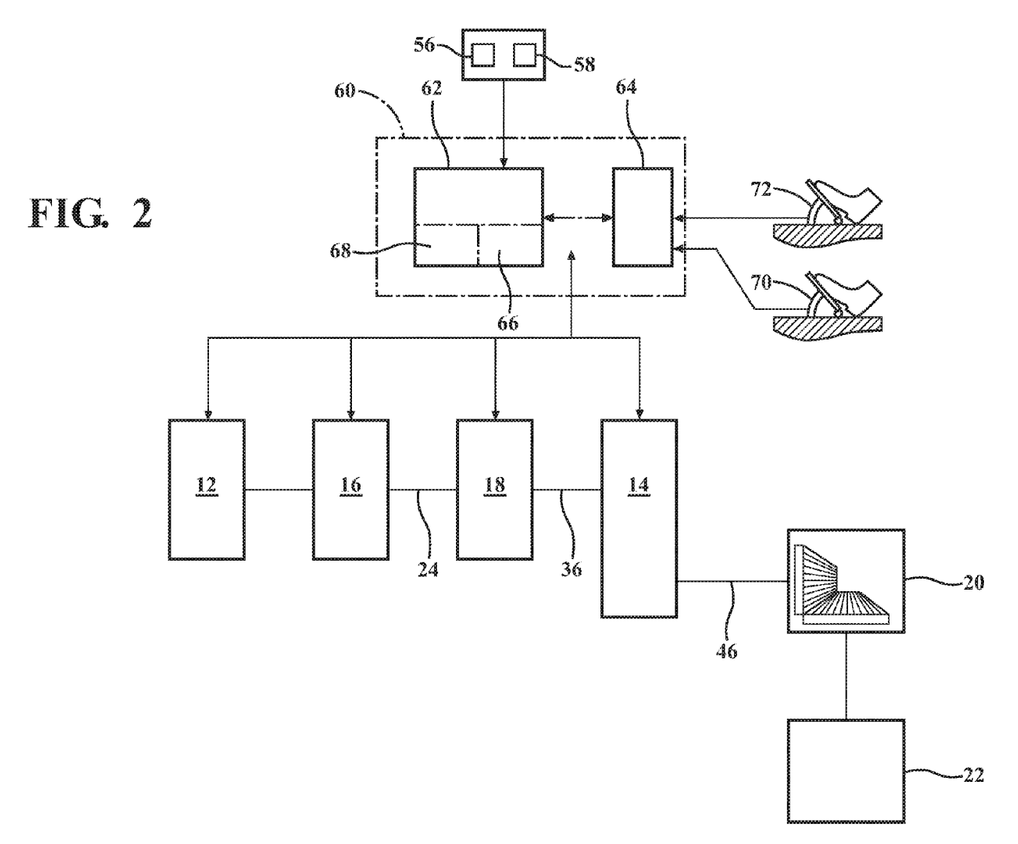
FIG. 2 is a schematic illustration of the motor vehicle propulsion system shown in FIG. 1, including a control system for controlling aspects of the motor vehicle propulsion system, according to the principles of the present disclosure.

Referring now to the drawings, wherein like reference numbers correspond to like or similar components throughout the several figures, FIGS. 1 and 2 schematically illustrate elements of a motor vehicle propulsion system 10 that includes an engine 12, such as an internal combustion engine, rotatably coupled to a continuously variable transmission (CVT) 14 via a torque converter 16 and a forward-reverse switching mechanism 18. The motor vehicle propulsion system 10 is coupled via a driveline 20 to a set of motor vehicle wheels 22 to provide tractive effort when employed on a vehicle. A gearbox (not shown) may also be included upline or downline of the CVT 14 for additional gearing options. Operation of the motor vehicle propulsion system 10 may be monitored and controlled by a control system 60 (see FIG. 2) in response to driver commands and other vehicle operation factors. The motor vehicle propulsion system 10 may be part of a device which may be a vehicle, a robot, farm implement, sports-related equipment or any other transportation device.

The engine 12 may be any suitable engine, such as an internal combustion engine capable of transforming hydrocarbon fuel to mechanical power to generate torque in response to commands originating from the control system 60. The engine 12 may also or alternatively include an electric motor (not shown). The torque converter 16 may be a device providing fluidic coupling between its input and output members for transferring torque. In alternative examples, the torque converter 16 could be omitted, and the clutches become the launch device.

The output member 24 of the torque converter 16 rotatably couples to the forward-reverse switching mechanism 18 and serves as an input to the CVT 14. The forward-reverse switching mechanism 18 is provided because the engine 12 is operated in a predetermined single direction. In the specific example of FIG. 1, the forward-reverse switching mechanism 18 includes a simple planetary gear set 26 including a sun gear 28, a ring gear 30 disposed coaxially about the sun gear 28, and a carrier 32 bearing a plurality of pinion gears 34 that mesh with both the sun gear 28 and the ring gear 30. In other variations, a double-pinion planetary gear set could be used, having one set of pinion gears meshing with a second set of pinion gears, the first set of pinion gears meshing with the sun gear 28 and the second set of pinion gears meshing with the ring gear 30. The output member 24 of the torque converter 16 is continuously connected to the ring gear 30, in this example. An input member 36 to the CVT 14 is continuously connected to the sun gear member 28, in this example.

The forward-reverse switching mechanism 18 further includes a forward clutch 38 and a reverse brake 40. The forward clutch 38 is selectively engageable to connect the sun gear 28 and CVT input member 36 to the ring gear 30 and the torque converter output member 24 so that these elements rotate together as a single unit. Accordingly, the engine 12 is then operable to drive the CVT 14 in a forward direction. The reverse brake 40 is selectively engageable to connect the carrier member 32 with a stationary member, such as the transmission housing 42 so that the direction of the input rotation would then be reversed, as applied to the CVT input member 36. It should be understood, however, that the torque converter output member 24 and CVT input member 36, as well as the reverse brake 40 and the forward clutch 38 could be interconnected in a different manner and still achieve forward-reverse switching, without falling beyond the spirit and scope of the present disclosure. For example, other power flows to alternate between forward and reverse could be used, such as alternative configurations using two or three clutches and one, two, or more gear sets. The forward clutch 38 and reverse brake 40 may each be controlled by an actuator, such as a hydraulically controlled actuator, that supplies fluid pressure to the clutch 38 or brake 40.

In this example, the CVT 14 is a belt-type or chain-type CVT that may be advantageously controlled by the control system 60. The CVT 14 includes a variator assembly 44 that transfers torque between the CVT input member 36 and a CVT output member 46. The variator assembly 44 includes a first, driving, or primary pulley 48, a second, driven, or secondary pulley 50, and a continuous rotatable device 52, such as a belt or chain, or any flexible continuous rotating device, that rotatably couples the first and second pulleys 48, 50 to transfer torque therebetween. The first pulley 48 and input member 36 rotate about a first axis A, and the second pulley 50 and output member 46 rotate about a second axis B. One of the first and second pulleys 48, 50 may act as a ratioing pulley to establish a speed ratio and the other of the first and second pulleys 48, 50 may act as a clamping pulley to generate sufficient clamping force to transfer torque. As used herein, the term 'speed ratio' refers to a variator speed ratio, which may be a ratio of a CVT output speed and a CVT input speed. Thus, the distance between the first pulley halves 48a, 48b may be varied (by moving one or more of the pulley halves 48a, 48b along the axis A) to move the continuous member 52 higher or lower within the groove defined between the two pulley halves 48a, 48b. Likewise, the second pulley halves 50a, 50b may also be moved with respect to each other along the axis B to change the ratio or torque-carrying capacity of the CVT 14. One or both pulley halves 48a, 48b, 50a, 50b of each pulley 48, 50 may be moved with an actuator, such as a hydraulically controlled actuator that varies the fluid pressure supplied to the pulleys 48, 50.

The motor vehicle propulsion system 10 preferably includes one or more sensors or sensing devices, such as Hall-effect sensors, for monitoring rotational speeds of various devices, including, e.g., a torque converter turbine speed sensor 56, a CVT variator input speed sensor 58, an engine speed sensor (not shown), a CVT variator output speed sensor (not shown), and one or more wheel speed sensors (not shown). Each of the sensors communicates with the control system 60.

Referring to FIG. 2, the control system 60 preferably includes at least one controller 62 and may include a user interface 64. A single controller 62 is shown for ease of illustration. The controller 62 may include a plurality of controller devices wherein each of the controllers 62 may be associated with monitoring and controlling a single system. This may include an engine control module (ECM) for controlling the engine 12 and a transmission controller (TCM) for controlling the CVT 14 and for monitoring and controlling a single subsystem, e.g., a torque converter clutch and/or the forward-reverse switching mechanism 18.

The controller 62 preferably includes at least one processor and at least one memory device 66 (or any non-transitory, tangible computer readable storage medium) on which are recorded instructions for executing instruction sets for controlling the CVT 14 and/or the forward clutch 38, and a memory cache 68. The memory 66 can store controller-executable instruction sets, and the processor can execute the controller-executable instruction sets stored in the memory 66.

The user interface 64 communicates with and monitors operator input devices, such as, for example, an accelerator pedal 70 and a brake pedal 72. The user interface 64 determines an operator torque request based upon the aforementioned operator inputs. The controller 62 also receives inputs from the various sensors, including the torque converter turbine speed sensor 56 and a CVT variator input speed sensor 58, which is fixed to the primary pulley 48.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component may be capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms can include any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event.

Communication between controllers, and communication between controllers, actuators and/or sensors may be accomplished using a direct wired link, a networked communication bus link, a wireless link or any another suitable communication link. Communication includes exchanging data signals in any suitable form, including, for example, electrical signals via a conductive medium, electromagnetic signals via air, optical signals via optical waveguides, and the like.

Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Figure 3:
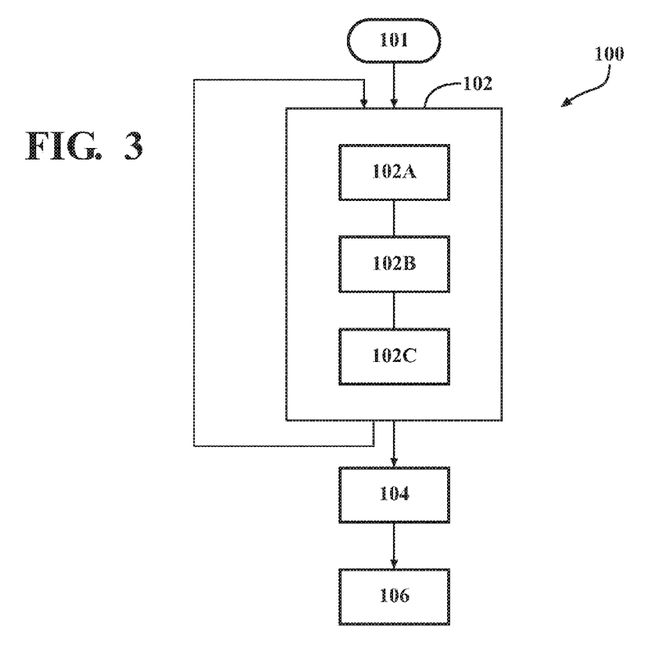
FIG. 3 schematically shows a block diagram of an example method that can be employed to control a clutch of the propulsion system of FIGS. 1-2, in accordance with the principles of the present disclosure.

The control system 60 of FIG. 2 may be programmed to execute the steps of a method 100 as defined in FIG. 3 and as discussed in greater detail below with reference to FIGS. 4-6. Referring now to FIG. 3, a flowchart of one variation of a method 100 stored on an instruction set and executable by the controller 62 of the control system 60 is shown. For example, the method 100 is a method for controlling a continuously variable transmission (CVT) including a variator assembly for a motor vehicle.

The method 100 may begin with a start block 101 and then proceed to a step or block 102, where the method 100 includes a step 102 of performing a plurality of clutch slip tests. Each clutch slip test includes substeps, including a substep 102A of decreasing pressure supplied to the clutch (such as clutch 38) until a clutch slip occurs. The clutch slip may be determined by a plurality of sensors. For example, a first speed sensor 56 may be fixed to the torque converter turbine of the torque converter 16, and a second speed sensor 58 may be fixed to the primary pulley 48 of the variator assembly of the CVT 14. The clutch slip may be determined by detecting a differential between the first and second speed sensors 56, 58. For example, during steady-state conditions with no slippage, the torque converter turbine and the primary pulley 48 speeds should correlate with each other. If slippage occurs, or is just starting to occur, however, a differential may begin to exist between the speed sensors 56, 58 of the torque converter 16 turbine and the primary pulley 48. This is illustrated in FIG. 4.

Figure 4:
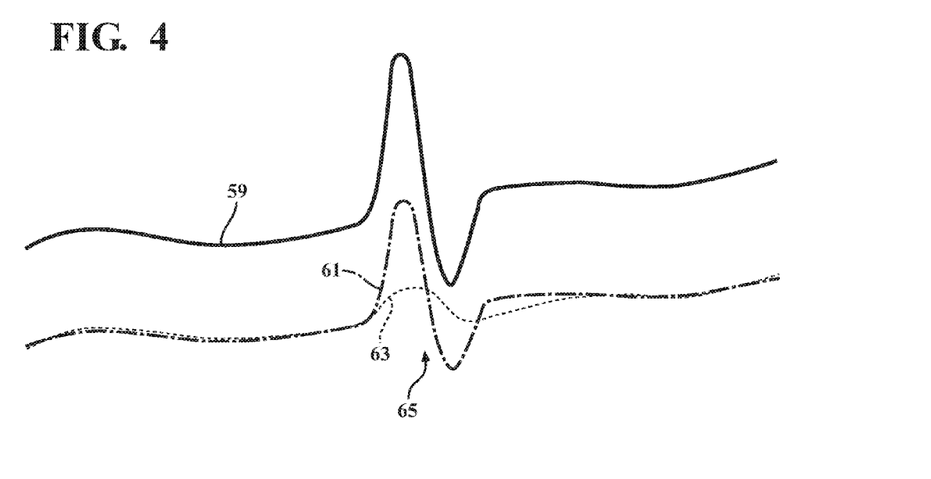
FIG. 4 shows a graph of an example turbine speed, primary pulley speed, and secondary pulley speed under clutch slip conditions, according to the principles of the present disclosure.

FIG. 4 shows a secondary pulley speed profile 59, a primary pulley speed profile 61, and a turbine speed profile 63. If there is no slippage of the forward clutch 38 or pulleys 48, 50, then each of the speed profiles 59, 61, 63 should correlate in that each should show the same acceleration or deceleration, and the turbine speed 63 and primary pulley speed 61 should be close to identical, while the secondary pulley speed 59 may be increased or decreased by a ratioing factor, as shown. In some forms, due to the architecture of the switching mechanism 18, the turbine speed profile 63 may also be offset from the primary pulley speed profile 61 by a factor. In FIG. 4, the forward clutch 38 is slipping, so the turbine speed 63 does not correlate to or equal the primary pulley speed 61 at section 65 in the graph. However, the secondary pulley speed 63 still correlates to the primary pulley speed 61, showing that the pulleys 48, 50 are not slipping with respect to each other. Accordingly, the forward clutch 38 is acting as a fuse that slips between the torque converter 16 turbine and the primary pulley 48, prior to the pulleys 48, 50 slipping with respect to each other. After an early nominal clutch slip is detected by virtue of the differential between the speed sensors 56, 58, a larger slip between the primary pulley 48 and the torque converter 16 turbine is imminent. Accordingly, it is desirable to immediately increase the pressure supplied to the clutch 38 after the early nominal slip is detected.

A clutch slip data point at which a clutch slip occurs includes a clutch slip pressure value having a corresponding clutch slip torque value. The clutch slip test step 102 further includes a substep 102B of storing in a memory the clutch slip data point including the clutch slip pressure value and the corresponding clutch slip torque value. The clutch slip test step 102 then includes a substep 102C of increasing pressure supplied to the clutch 38 after storing the clutch slip data point in the memory.

Figure 5:
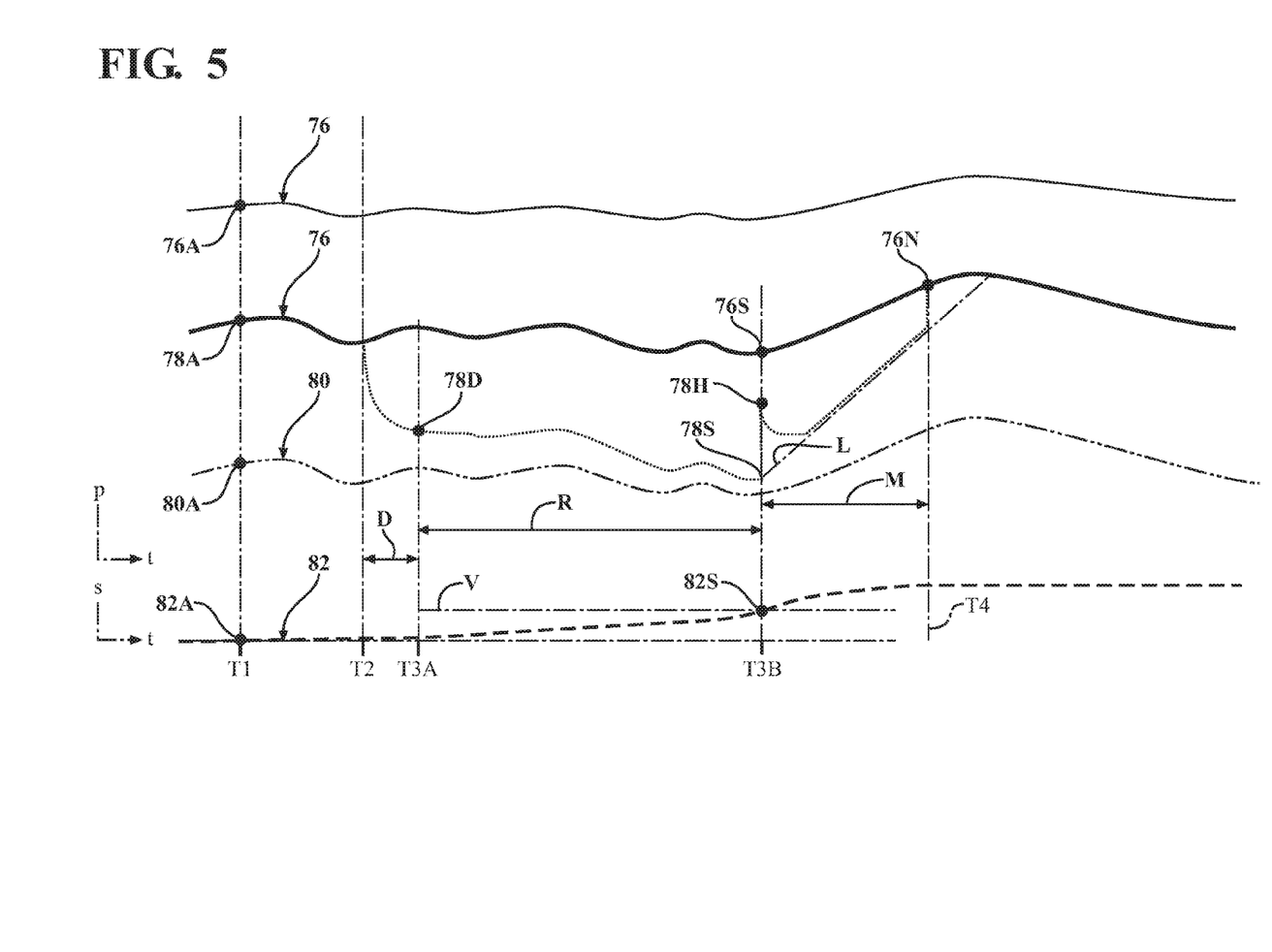
FIG. 5 shows a graph of the a control strategy and method applied of the propulsion system and method shown in FIGS. 1-3, in accordance with the principles of the present disclosure.

The clutch slip test may be understood in more detail with respect to FIG. 5, which shows a plurality of pressure profiles as a function of time. The clutch torque is illustrated with profile line 76, and the pressure applied to the clutch 38 is illustrated at profile line 78. A clutch critical pressure is shown at profile line 80; the clutch critical pressure is a calibrated or learned pressure at which it is learned or believed that the clutch 38 will start to slip. The clutch critical pressure is adaptively learned, as explained below. Before the clutch critical pressure is learned for a particular vehicle, the clutch critical pressure is calibrated with a margin of safety. Each of the pressure profiles 76, 78, 80 are shown with pressure p on a y-axis and time t along an x-axis. A clutch slip profile 82 is also shown in FIG. 5, which has a different scale than the pressure scale of the pressure profile lines 76, 78, 80. The clutch slip profile 82 is shown with speed sensor differential s on a y-axis and time t on an x-axis, where t is the same time for all profiles 76, 78, 80, 82 shown.

At a time prior to performing a clutch slip test, such as at time T1, the clutch 38 is operating at a running clutch pressure 78 having a value 78A and a corresponding torque having a value 76A. The clutch critical pressure 80 has a value 80A at time T1. As the clutch running pressure value 78A is higher than the clutch critical pressure value 80A, the clutch 38 has a zero or negligible slip, and thus, speed sensor differential (indicative of an early slip) at time T1 at point 82A is zero or about zero.

The control system 60 and/or method 100 begins to run a clutch slip test at time T2. Accordingly, the applied pressure 78 to the clutch 38 is lowered starting at time T2. As explained above with respect to step 102A, the clutch pressure 78 continues to be lowered until a clutch slip is detected. Thus, after time T2, the clutch slip detection profile 82 begins to rise until a clutch slip threshold V (a speed sensor differential having a difference of a predetermined magnitude V) is crossed at time T3B, where the speed sensor differential is no longer zero, but has a positive value of 82S meeting or exceeding the threshold V. At time T3B, the applied clutch pressure 78 has a value of 78S, which corresponds to a clutch torque value of 76S. It should be noted that the clutch critical pressure has a value of 80S at time T3B, which is still lower than the applied clutch pressure 78S even through a clutch slip has been detected. This is because the clutch critical pressure 80 as learned, calculated, or calibrated is slightly offset from an actual pressure at which the clutch 38 would slip (due to changes in the system, error or safety factor in calibration, or any number of reasons).

As stated above, at the time T3B when the clutch slip is detected, the method 100 stores the clutch slip data point including the applied pressure value 78S and the corresponding torque value 76S into the memory 66. The applied clutch pressure 78 is then immediately increased to a value 78H that is higher than the clutch slip pressure value 78S to prevent a larger, noticeable slip from occurring. The speed sensor differential 82 typically continues to become greater after time T3B, as shown, and can be reset at any time prior to running another clutch slip test.

In some forms, the step 102B of decreasing the applied clutch pressure 78 supplied to the clutch 38 may include first decreasing the applied pressure 78 to a deboost pressure 78D before further decreasing the applied pressure 78 to the clutch slip pressure 78S. Accordingly, during the clutch slip test, the applied pressure 78 may be rapidly decreased to the deboost pressure 78D in a deboost phase or time period D, from time T2 to time T3A, and then more slowly decreased from time T3A to time T3B in a ramp phase or slip time period R. The pressure may be first rapidly decreased to the deboost pressure to get the clutch pressure as close to the clutch critical pressure as possible without actually slipping to shorten the amount of time the test takes. The slip time period R may be longer than the deboost time period D, but not necessarily; if the learned clutch critical pressure is too high (higher than the actual pressure that will allow slip), then slip time period R takes longer, but if the learned clutch critical is too low (lower than the actual pressure that will allow slip), the slip time period R will be very short. Thus, the applied pressure 78 is quickly decreased to the deboost pressure 78D and then more slowly lowered toward the last-learned or calibrated clutch critical pressure 80. As can be seen in the slip time period R, the applied clutch pressure 78 is lowered in proportion to the clutch critical pressure 80, tracking along the shape of the clutch critical pressure profile 80 until a slip is detected. Accordingly, the applied clutch pressure 78 is prevented from crossing the clutch critical pressure profile 80 too early due to acceleration changes and changes in the clutch critical pressure 80 due to varying inputs that would not provide a reliable learned clutch slip data point.

After the supplied pressure 78 to the clutch 38 is increased at time T3B to the higher pressure 78H, the supplied pressure 78 may be gradually dropped to a learned profile line L that includes an offset determined from a new learned clutch critical pressure. The supplied pressure 78 may then be increased along the learned offset profile line L in a mitigate slip time period or phase M. At time T4, after the slip is mitigated, the supplied pressure 78 to the clutch 38 is increased to a running clutch pressure having a value 76N that is based on a new learned clutch critical pressure 80 plus a safety factor. The clutch critical pressure profile 80 is based on the new learned clutch critical pressure 80 after time T3B when the new clutch slip data point is collected. It should be understood, however, that pressure reduction from the point 78H can be calibrated in many different ways. In addition, the pressure need not necessarily be increased as high as point 78H, but rather, the ramp L could simply be followed to increase the pressure. The ramp L can also be a fixed rate ramp or a ramp based on the pressure difference between the current commanded pressure and the adapted clutch critical pressure 80.

Referring back to FIG. 3, the method step 102 includes performing multiple clutch slip tests. In some examples, the clutch slip tests are performed until a sufficient number of clutch slip data points are collected to learn a clutch critical pressure 80 of the system. The plurality of clutch slip tests may be performed for a duration of vehicle driving conditions within a normal driving range. The normal driving range may be determined by a set of conditions determined to be safe conditions at which to perform a clutch slip test. For example, in some variations, a clutch slip test is only performed if one, several, or all of the following conditions are met: the vehicle is operating in steady-state conditions; the turbine acceleration is within a predetermined turbine acceleration range (above a low threshold and below a high threshold); the engine acceleration is within a predetermined engine acceleration range (above a low threshold and below a high threshold); vehicle acceleration is within a predetermined vehicle acceleration range (above a low threshold and below a high threshold, not coasting); the throttle position exceeds a predetermined threshold (e.g., not coasting); the torque converter clutch is engaged; clutch slip is not detected (i.e., reliable data would not be gained from running a clutch slip test if slip is already occurring); transmission fluid temperature is in a predetermined temperature range; propulsion system diagnostics and the plurality of sensors are free of a default mode; CVT ratio change is with a predetermined CVT ratio change range; clutch pressure scheduling arbitration allows a clutch slip test to be undertaken; and stability timer conditions are met. Additional or alternative conditions may also be required by the system, if desired.

In some forms, the clutch slip tests may begin to be performed each time a key cycle of the vehicle is performed. In addition, each clutch slip test may be performed with a predetermined delay period between performing each clutch slip test, for example, to make sure that the clutch slip tests are not performed so close together that the clutch slip is not mitigated before starting a new test.

In some variations, a sufficient number of clutch slip tests to learn the clutch critical pressure requires that the memory 66 collect clutch slip data points in multiple torque ranges. For example, the method 100 and control system 60 may perform clutch slip tests at least until one or more clutch slip data points are collected having a clutch slip torque value in a first range and one or more clutch slip data points are collected having a clutch slip torque value in a second range. In some forms, more than two ranges may be used.

Figure 6:
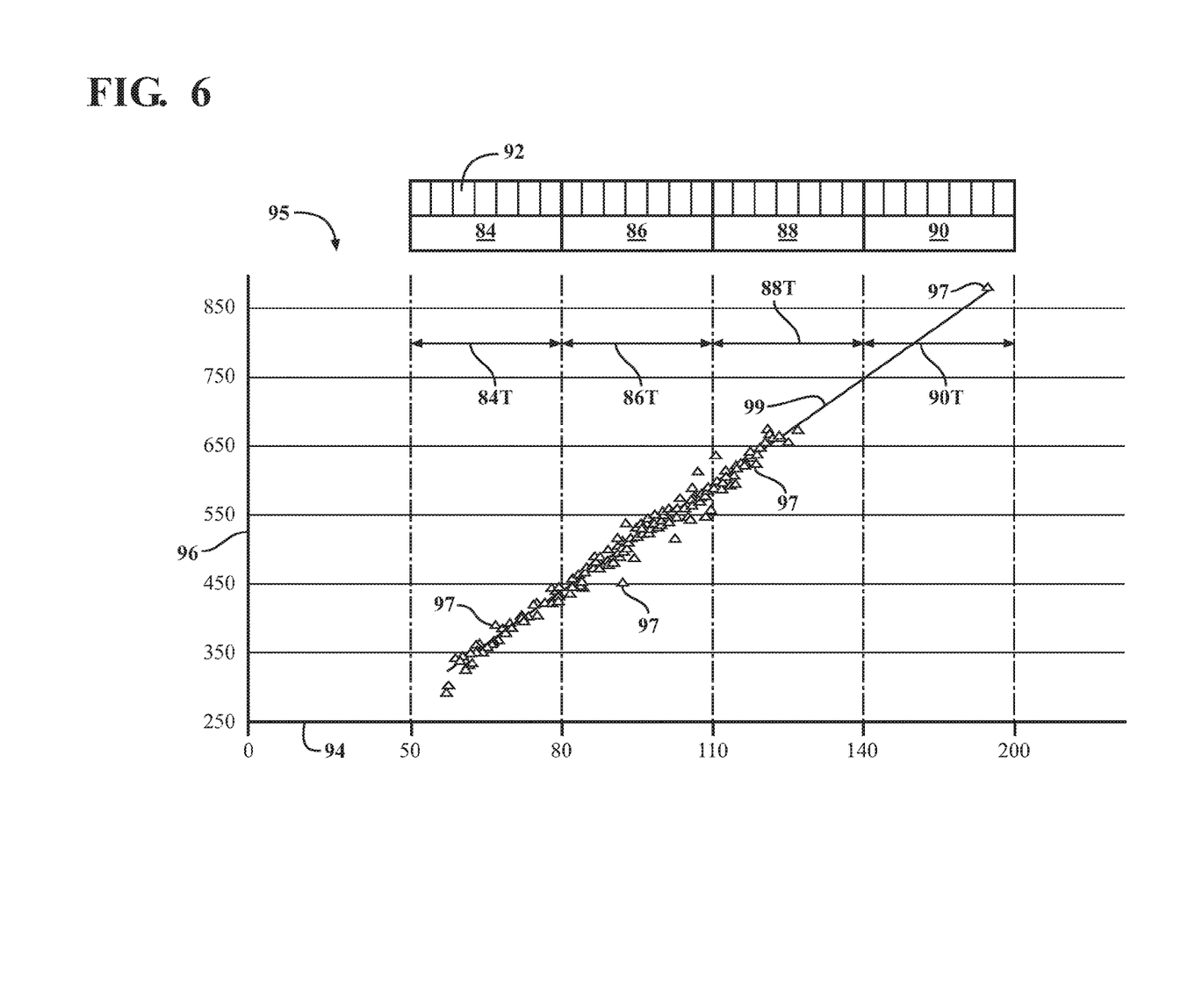
FIG. 6 shows a graph and bin system of the control system and method disclosed in FIGS. 2-3 and described in FIG. 5, according to the principles of the present disclosure.

For further illustration of multiple torque ranges, and referring now to FIG. 6, a bin system is illustrated wherein four bins 84, 86, 88, 90 representing four torque ranges 84T, 86T, 88T, 90T are used by the memory 66 for collecting clutch slip data points. The software bins 84, 86, 88, 90 may each be configured to hold a finite number of a clutch slip data points, and more specifically, the clutch torque values of the clutch slip data points. For example, each bin 84, 86, 88, 90 may contain eight slots 92 for storing clutch slip torque values corresponding to a clutch slip pressure at which clutch slip was detected (at time T3B in FIG. 5). The first bin 84 may be a bottom-low range for low torque values, such as torque values in the range of about 50-80 Nm. The second bin 86 may be a medium-low range for medium-low torque values, such as torque values in the range of about 80-110 Nm. The third bin 88 may be a medium-high range for medium-high torque values, such as torque values in the range of about 110-140 Nm. The fourth bin 90 may be a top-high range for high torque values, such as torque values in the range of about 140-200 Nm. It should be understood that other torque ranges could be used, more than or fewer than four bins could be used, and other variations could be adopted, without falling beyond the spirit and scope of the present disclosure.

In some variations, each torque range 84T, 86T, 88T, 90T is mutually exclusive and non-overlapping with adjacent torque ranges 84T, 86T, 88T, 90T. Thus, in such a variation, it should be understand that only a single torque range 84T, 86T, 88T, 90T and bin 84, 86, 88, 90 includes a particular torque value, such as a torque value on the upper edge of a particular range 84T, 86T, 88T and on the lower edge of the adjacent higher torque range 86T, 88T, 90T, respectively. Accordingly, the adjacent upper torque range 86T, 88T, 90T would actually start with a torque value slightly above the highest torque range of the adjacent lower torque range 84T, 86T, 88T, respectively.

As shown in FIG. 6, a graph 95 of clutch slip data points corresponds to the torque bins 84, 86, 88, 90 and torque ranges 84T, 86T, 88T, 90T. Torque 94 in Nm is plotted along an x-axis with torque values of 0, 50, 80, 110, 140, and 200 shown. Pressure 96, in kPa is plotted along a y-axis with pressure values of 250, 350, 450, 550, 650, 750, and 850 shown. Each clutch slip data point 97 collected by the memory 66 is plotted on the graph 95.

Referring to FIGS. 3 and 6, after performing at least a preliminarily sufficient number of clutch slip tests (to obtain data points in one or more of the torque bins 84, 86, 88, 90), the method 100 includes a step 104 of determining a gain and an offset based on the plurality of clutch slip data points, where the gain is a clutch pressure versus clutch torque capacity gain, and the offset is a clutch pressure offset. The gain and the offset may be determined, for example, by interpolating a best-fit line 99 through the plurality of clutch slip data points 97. As each clutch slip test is run in the iterative step 102 of the method 100, a new clutch slip data point 97 is plotted and fits into one of the slots 92 of one of the torque bins 84, 86, 88, 90. If every slot 92 of the relevant torque bin 84, 86, 88, 90 is full, one of the clutch slip data points 97 (such as the oldest data point 97 in the particular bin 84, 86, 88, 90) may be replaced by the new clutch slip data point 97 in a slot 92 of the relevant bin 84, 86, 88, 90, by way of example. The best-fit line 99 may be updated each time a clutch slip data point is stored.

In some variations, the method 100 further includes performing a rate limiting function to update the best-fit line 99, so that a change to the best-fit line 99 is limited to a predetermined maximum change for each clutch slip data point 97 stored. For example, if a new clutch slip data point 97 would cause a large change to the best-fit line 99, the method 100 and control system 60 may allow only a smaller, incremental change to be made to the best-fit line 99 each time that a new clutch slip data point 97 is stored in the memory 66.

The required number of clutch slip data points 97 required to determine the gain and the offset, and determine the best-fit line 99, may vary based on design choice. For example, in some variations, a best-fit line 99 may be formed from just two clutch slip data points 97. The control system 60 could require that each of the two clutch slip data points 97 be from different bins 84, 86, 88, 90 for a more accurate determination of the gain and offset, if desired. In some variations, a clutch slip data point 97 in each bin 84, 86, 88, 90 could be required to determine the best-fit line 99 and/or the gain and offset, or a plurality of clutch slip data points 97 could be required in each bin 84, 86, 88, 90. Use of a plurality of bins 84, 86, 88, 90, such as four bins with a finite number of slots 92, such as eight slots 92 in each bin 84, 86, 88, 90 allows fresh data to be cycled in with a lowered risk of data being located only in a certain torque region, such as a midpoint.

Some data points could be deemed so unreliable that they not to be placed into any bin 84, 86, 88, 90. For example, a null-low torque range may exist that is lower than each of the torque ranges 84T, 86T, 88T, 90T of the four bins 84, 86, 88, 90, and any data point found to be in the null-low torque range (e.g., less than 50 Nm) could be discarded. Likewise, a null-high torque range may exist that is higher than each of the torque ranges 84T, 86T, 88T, 90T of the four bins 84, 86, 88, 90, and any data point found to be in the null-high torque range (e.g., greater than 200 Nm) could be discarded.

The method 100 further includes a step 106 of supplying a running clutch pressure 78 to the clutch 38 that is lower than a pulley clamping pressure of the variator assembly and higher than a clutch critical pressure 80 determined based on the gain and the offset, where, as described above, the gain is a clutch pressure versus clutch torque capacity gain, and the offset is a clutch pressure offset. For example, referring to FIG. 5, when a new clutch critical pressure 80 is determined at time T3B, and the mitigation phase M ends, the supplied pressure 78 to the clutch 38 is supplied at a pressure value above the clutch critical pressure 80 and below a pulley clamping pressure (not shown). The supplied pressure 78 is based on the clutch critical pressure 80, a safety factor, and any other desirable offset.

For each iteration of the clutch slip test, the method 100 may include applying the running clutch pressure 78 to the clutch 38 prior to performing each clutch slip test, where the running clutch pressure 78 is equal to a clutch critical pressure plus a safety factor, plus any other desired offsets.

Referring to FIG. 5, the method 100 and system 60 may have a further built in protection, whereby if a clutch slip is detected one or more times (such as five or six times) during the deboost time period D, all of the clutch slip data points 97 (shown in FIG. 6) are erased and the method 100 starts over to determine new clutch slip data points 97 because the current clutch critical pressure 80 is clearly set too low and lower than the actual pressure at which the clutch 38 will slip. The first deboost pressure 78D may be reset to a second deboost pressure that is higher than the first deboost pressure 78D, in order to come to a deboost pressure that is not in a slipping range. The first deboost pressure may be changed to the second deboost pressure by increasing the stored clutch pressure offset by a calibratable scale of the first deboost pressure to arrive at the second deboost pressure. In some variations, the deboost pressure 78D is reset only after several clutch slips are detected in the deboost range D. If the deboost pressure 78D needs to be reset, the system 60 could also increase the pulley clamping pressure in order to avoid a pulley slip.

The control system 60 may be configured to execute each of the steps illustrated in FIG. 3. Thus, the entire description of the method 100 may be applied to the control system 60 to effectuate the method 100. Furthermore, the controller 62 may be or include a controller that includes a number of control logics that are configured to execute the steps of the method 100 explained above.

The controller 62 of the control system 60 may include a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

As explained above, the forward clutch 38 is acting as a fuse that slips between the torque converter 16 turbine and the primary pulley 48, prior to the pulleys 48, 50 slipping with respect to each other. However, with the adaptive learning method 100 disclosed herein, the clutch critical pressure is learned 80 so that the clutch 38 can fuse without constant commanded microslip. For example, the system can be run without trying to hold a slip reference greater than zero and still be able to fuse passively.

The detailed description and the drawings or figures are supportive and descriptive of the disclosure, but the scope of the disclosure is defined solely by the claims. While some examples for carrying out the claimed disclosure have been described in detail, various alternative designs and examples exist for practicing the disclosure defined in the appended claims. Furthermore, the examples shown in the drawings or the characteristics of various examples mentioned in the present description are not necessarily to be understood as examples independent of each other. Rather, it is possible that each of the characteristics described in one of the examples of an example can be combined with one or a plurality of other desired characteristics from other examples, resulting in other examples not described in words or by reference to the drawings. Accordingly, such other examples fall within the framework of the scope of the appended claims.

What is claimed is:

1. A method for controlling a clutch of a continuously variable transmission (CVT) including a variator assembly for a motor vehicle, the method comprising:
performing a plurality of clutch slip tests, each clutch slip test including:
decreasing pressure supplied to the clutch until a clutch slip occurs at a clutch slip data point including a clutch slip pressure value and a corresponding clutch slip torque value, the clutch slip being determined by a plurality of sensors;
storing in a memory the clutch slip data point including the clutch slip pressure value and the corresponding clutch slip torque value; and
increasing pressure supplied to the clutch after storing the clutch slip data point in the memory,
wherein the step of performing the plurality of clutch slip tests results in a plurality of clutch slip data points being stored in the memory including at least a first clutch slip data point having a clutch slip torque value in a first range and at least a second clutch slip data point having a clutch slip torque value in a second range;
determining a gain and an offset based on the plurality of clutch slip data points, where the gain is a clutch pressure versus clutch torque capacity gain, and the offset is a clutch pressure offset; and
supplying a running clutch pressure to the clutch that is lower than a pulley clamping pressure of the variator assembly and higher than a clutch critical pressure determined based on the gain and the offset.

2. The method of claim 1, the step of determining the gain and the offset based on the plurality of clutch slip data points further comprising interpolating a best-fit line through the plurality of clutch slip data points.

3. The method of claim 2, the first range being a medium-low range and the second range being a medium-high range, wherein the step of performing the plurality of clutch slip tests results in a plurality of clutch slip data points being stored in the memory further including at least a third clutch slip data point having a clutch slip torque value in a bottom-low range and at least a fourth clutch slip data point having a clutch slip torque value in a top-high range.

4. The method of claim 3, wherein the step of performing the plurality of clutch slip tests is performed for a duration of vehicle driving conditions within a normal driving range, the normal driving range defined by a plurality of safe conditions at which to perform a clutch slip test.

5. The method of claim 4, each of the bottom-low range, the medium-low range, the medium-high range, and the top-high range being greater than a null-low torque range, wherein each of the bottom-low range, the medium-low range, the medium-high range, and the top-high range are less than a null-high torque range, and wherein each of the bottom-low range, the medium-low range, the medium-high range, and the top-high range do not overlap with each other.

6. The method of claim 4, the step of performing the plurality of clutch slip tests including performing each clutch slip test of the plurality of clutch slip tests with a predetermined delay period between performing each clutch slip test.

7. The method of claim 4, further comprising determining whether a plurality of predetermined conditions are met prior to performing the step of performing the plurality of clutch slip tests, the plurality of predetermined conditions including at least a plurality of the following: the vehicle operating in steady-state conditions; turbine acceleration being within a predetermined turbine acceleration range; engine acceleration being within a predetermined engine acceleration range; vehicle acceleration being within a predetermined vehicle acceleration range; a throttle position exceeding a predetermined threshold; a torque converter clutch being engaged; clutch slip not detected; transmission fluid temperature being within a predetermined temperature range; the plurality of sensors being free of a default mode; and CVT ratio change being within a predetermined CVT ratio change range.

8. The method of claim 7, wherein the step of decreasing pressure supplied to the clutch until a clutch slip occurs includes first decreasing the pressure to a deboost pressure in a deboost time period and second decreasing the pressure from the deboost pressure until the clutch slip occurs in a slip time period, the pressure being decreased more rapidly in the deboost time period than in the slip time period.

9. The method of claim 8, wherein the plurality of sensors includes a first speed sensor fixed to a torque converter turbine and a second speed sensor fixed to a primary pulley of the variator assembly, where the method further comprises determining the clutch slip by detecting a differential between the first and second speed sensors, the method further comprising applying the running clutch pressure to the clutch prior to performing each clutch slip test, the running clutch pressure being equal to at least the clutch critical pressure plus a safety factor.

10. The method of claim 9, further comprising updating the best-fit line when a clutch slip data point is stored, the method further comprising performing a rate limiting function so that a change to the best-fit line is limited to a predetermined maximum change for each clutch slip data point stored.

11. The method of claim 10, the deboost pressure being a first deboost pressure, the method further comprising determining whether a clutch slip has occurred during the deboost time period; and if a clutch slip has occurred during the deboost time period, erasing the clutch slip data points stored in the memory, and resetting the first deboost pressure to a second deboost pressure that is higher than the first deboost pressure.

12. A control system for controlling a clutch of a continuously variable transmission (CVT) having a variator assembly, the control system comprising a memory and an instruction set, the instruction set executable to:
perform a plurality of clutch slip tests, wherein for each clutch slip test, the control system is configured to:
decrease pressure supplied to the clutch until a clutch slip occurs at a clutch slip data point including a clutch slip pressure value and a corresponding clutch slip torque value, the clutch slip being determined by a plurality of sensors;
store in the memory the clutch slip data point including the clutch slip pressure value and the corresponding clutch slip torque value; and
increase pressure supplied to the clutch after storing the clutch slip data point in the memory,
wherein the control system is configured to store in the memory at least a first clutch slip data point having a clutch slip torque value in a first range and at least a second clutch slip data point having a clutch slip torque value in a second range;
determine a gain and an offset based on the plurality of clutch slip data points, where the gain is a clutch pressure versus clutch torque capacity gain, and the offset is a clutch pressure offset; and cause a hydraulic system to supply a running clutch pressure to the clutch that is lower than a pulley clamping pressure of the variator assembly and higher than a clutch critical pressure determined based on the gain and the offset.

13. The control system of claim 12, the control system being integrated within a motor vehicle, the control system being configured to perform the plurality of clutch slip tests with a predetermined delay period between each clutch slip test, wherein the control system is configured to perform the plurality of clutch slip tests for a duration of vehicle driving conditions within a normal driving range defined by a plurality of safe conditions, the control system being configured to determine whether a plurality of predetermined conditions are met prior to performing a clutch slip test of the plurality of clutch slip tests, the plurality of predetermined conditions including at least a plurality of the following: the vehicle operating in steady-state conditions; turbine acceleration being within a predetermined turbine acceleration range; engine acceleration being within a predetermined engine acceleration range; vehicle acceleration being within a predetermined vehicle acceleration range; a throttle position exceeding a predetermined threshold; a torque converter clutch being engaged; clutch slip not detected; transmission fluid temperature being within a predetermined temperature range; the plurality of sensors being free of a default mode; and CVT ratio change being within a predetermined CVT ratio change range.

14. The control system of claim 13, the first range being a medium-low range and the second range being a medium-high range, wherein the plurality of clutch slip data points further includes at least a third clutch slip data point having a clutch slip torque value in a bottom-low range and at least a fourth clutch slip data point having a clutch slip torque value in a top-high range, the control system being configured to interpolate a best-fit line through the plurality of clutch slip data points.

15. The control system of claim 14, each of the bottom-low range, the medium-low range, the medium-high range, and the top-high range being greater than a null-low torque range, wherein each of the bottom-low range, the medium-low range, the medium-high range, and the top-high range are less than a null-high torque range, and wherein each of the bottom-low range, the medium-low range, the medium-high range, and the top-high range do not overlap with each other.

16. The control system of claim 15, wherein to perform a clutch slip test, the control system is configured to first decrease the pressure to a first deboost pressure in a deboost time period and second decrease the pressure from the first deboost pressure until the clutch slip occurs in a slip time period, the pressure being decreased more rapidly in the deboost time period than in the slip time period, the control system being configured to update the best-fit line when a clutch slip data point is stored, the control system being configured to perform a rate limiting function so that a change to the best-fit line is limited to a predetermined maximum change for each clutch slip data point stored, the control system being further configured to determine whether a clutch slip has occurred during the deboost time period, and if a clutch slip has occurred during the deboost time period, the control system is configured to erase the clutch slip data points stored in the memory and reset the first deboost pressure to a second deboost pressure that is higher than the first deboost pressure, the control system being configured to determine the clutch slip by detecting a differential between first and second speed sensors of the plurality of sensors, the first speed sensor being fixed to a torque converter turbine and the second speed sensor being fixed to a primary pulley of the variator assembly, the control system being configured to cause the hydraulic system to apply the running clutch pressure to the clutch prior to the control system performing each clutch slip test, the running clutch pressure being equal to at least the clutch critical pressure plus a safety factor.

17. A continuously variable transmission (CVT) for a motor vehicle, comprising:
 a variator assembly including a first pulley and a second pulley, the first and second pulleys rotatably coupled by a continuous rotatable device, wherein the second pulley is coupled to an output member;
 the first pulley including a first moveable sheave that is translatable along a first axis relative to a first stationary sheave in response to urging of a first actuator;
 the second pulley including a second moveable sheave that is translatable along a second axis relative to a second stationary sheave in response to urging of a second actuator;
 a clutch selectively engageable to couple the first pulley to an input member to place to the CVT in a forward mode of operation;
 a hydraulic system configured to supply pressure to the variator assembly and the clutch; and
 a control system having at least one controller, a memory, and a plurality of sensors in communication with the controller, the control system being configured to:
  perform a plurality of clutch slip tests, wherein for each clutch slip test, the control system is configured to:
   decrease pressure supplied to the clutch by the hydraulic system until a clutch slip occurs at a clutch slip data point including a clutch slip pressure value and a corresponding clutch slip torque value, the clutch slip being determined by at least a portion of the plurality of sensors;
   store in the memory the clutch slip data point including the clutch slip pressure value and the corresponding clutch slip torque value; and
   increase pressure supplied to the clutch by the hydraulic system after storing the clutch slip data point in the memory,
  wherein the control system is configured to store in the memory at least a first clutch slip data point having a clutch slip torque value in a first range and at least a second clutch slip data point having a clutch slip torque value in a second range;
  determine a gain and an offset based on the plurality of clutch slip data points, where the gain is a clutch pressure versus clutch torque capacity gain, and the offset is a clutch pressure offset; and
  cause the hydraulic system to supply a running clutch pressure to the clutch that is lower than a pulley clamping pressure of the variator assembly and higher than a clutch critical pressure determined based on the gain and the offset.

18. The CVT of claim 17, the first range being a medium-low range and the second range being a medium-high range, wherein the plurality of clutch slip data points further includes at least a third clutch slip data point having a clutch slip torque value in a bottom-low range and at least a fourth clutch slip data point having a clutch slip torque value in a top-high range, the control system being configured to interpolate a best-fit line through the plurality of clutch slip data points, each of the bottom-low range, the medium-low range, the medium-high range, and the top-high range being greater than a null-low torque range, wherein each of the bottom-low range, the medium-low range, the medium-high range, and the top-high range are less than a null-high torque range, and wherein each of the bottom-low range, the medium-low range, the medium-high range, and the top-high range do not overlap with each other.

19. The CVT of claim 18, the control system being configured to perform the plurality of clutch slip tests with a predetermined delay period between each clutch slip test, wherein the control system is configured to perform the plurality of clutch slip tests for a duration of vehicle driving conditions within a normal driving range defined by a plurality of safe conditions, the control system being configured to determine whether a plurality of predetermined conditions are met prior to performing a clutch slip test of the plurality of clutch slip tests, the plurality of predetermined conditions including at least a plurality of the following: the vehicle operating in steady-state conditions; turbine acceleration being within a predetermined turbine acceleration range; engine acceleration being within a predetermined engine acceleration range; vehicle acceleration being within a predetermined vehicle acceleration range; a throttle position exceeding a predetermined threshold; a torque converter clutch being engaged; clutch slip not detected; transmission fluid temperature being within a predetermined temperature range; a set of propulsion system diagnostics being free of a default mode; the plurality of sensors being free of a default mode; CVT ratio change being within a predetermined CVT ratio change range; a clutch control scheduling arbitration allowing a clutch slip test to be undertaken; and a set of stability timer conditions being met.

20. The CVT of claim 19, wherein to perform a clutch slip test, the control system is configured to cause the hydraulic system to first decrease the pressure supplied to the clutch to a first deboost pressure in a deboost time period and second to decrease the pressure supplied to the clutch from the first deboost pressure until the clutch slip occurs in a slip time period, the pressure being decreased more rapidly in the deboost time period than in the slip time period, the control system being configured to update the best-fit line when a clutch slip data point is stored, the control system being configured to perform a rate limiting function so that a change to the best-fit line is limited to a predetermined maximum change for each clutch slip data point stored, the control system being configured to determine the clutch slip by detecting a differential between first and second speed sensors of the plurality of sensors, the first speed sensor being fixed to a torque converter turbine and the second speed sensor being fixed to the first pulley of the variator assembly, the control system being configured to cause the hydraulic system to apply the running clutch pressure to the clutch prior to the control system performing each clutch slip test, the running clutch pressure being equal to at least a clutch critical pressure plus a safety factor.

* * * * *